(12) United States Patent
Hinkle

(10) Patent No.: US 8,313,123 B1
(45) Date of Patent: Nov. 20, 2012

(54) DEVICE FOR CAPPING AND SEALING REFRIGERATION SERVICE VALVE FITTINGS OF QUICK DISCONNECT TYPE

(76) Inventor: Derek H. Hinkle, Catonsville, MD (US)

( * ) Notice: Subject to any disclaimer, the term of this patent is extended or adjusted under 35 U.S.C. 154(b) by 561 days.

(21) Appl. No.: 12/590,982

(22) Filed: Nov. 18, 2009

Related U.S. Application Data

(60) Provisional application No. 61/273,406, filed on Aug. 5, 2009.

(51) Int. Cl.
*F16L 55/10* (2006.01)
(52) U.S. Cl. .............................. 285/45; 285/901; 138/89
(58) Field of Classification Search ................. 285/901, 285/45; 138/89, 96 R, 89.4, 89.1
See application file for complete search history.

(56) References Cited

U.S. PATENT DOCUMENTS

| | | | |
|---|---|---|---|
| 554,666 A * | 2/1896 | Feltner | 285/901 |
| 910,128 A * | 1/1909 | Hammer | 285/901 |
| 2,625,955 A * | 1/1953 | Day | 285/45 |
| 2,739,374 A | 3/1956 | Rudolf | |
| 2,765,181 A | 10/1956 | Butterfield | |
| 3,628,768 A | 12/1971 | Hutt | |
| 3,654,956 A | 4/1972 | Tsubouchi | |
| 3,732,886 A | 5/1973 | Mullins | |
| 4,002,186 A * | 1/1977 | Fink et al. | 285/80 |
| 4,095,713 A * | 6/1978 | Norton | 220/270 |
| 4,253,488 A * | 3/1981 | Leverberg | 137/382 |
| 4,281,678 A | 8/1981 | Claycomb | |
| 4,385,495 A | 5/1983 | Kubota | |
| 4,393,655 A | 7/1983 | Komorizono | |
| 4,602,482 A | 7/1986 | Kubota et al. | |
| 4,703,914 A * | 11/1987 | Hoffmann | 251/120 |
| 4,872,304 A | 10/1989 | Thompson | |
| 4,886,947 A | 12/1989 | Thompson | |
| 4,892,117 A | 1/1990 | Spalink et al. | |
| 5,022,713 A | 6/1991 | Pugh et al. | |
| 5,056,560 A | 10/1991 | DeMartelaere | |
| 5,066,049 A * | 11/1991 | Staples | 285/80 |
| 5,139,049 A | 8/1992 | Jensen et al. | |
| 5,169,003 A | 12/1992 | Traupman | |
| 5,269,342 A * | 12/1993 | Portis et al. | 138/89 |
| 5,277,327 A | 1/1994 | Nakano et al. | |
| 5,333,467 A | 8/1994 | Pearl et al. | |
| RE34,715 E | 9/1994 | Gudenau et al. | |
| 5,823,222 A * | 10/1998 | Minshull et al. | 137/15.15 |
| 6,050,295 A * | 4/2000 | Meisinger et al. | 137/541 |
| 6,138,987 A | 10/2000 | Lee | |
| 6,273,132 B1 | 8/2001 | Chrysler et al. | |
| 6,276,386 B1 | 8/2001 | Stubbeman | |
| 6,371,319 B2 | 4/2002 | Yeaton et al. | |
| 6,539,988 B1 | 4/2003 | Cowan et al. | |
| 6,546,952 B1 | 4/2003 | Martin et al. | |

(Continued)

*Primary Examiner* — David Bochna
(74) *Attorney, Agent, or Firm* — Donald A. Kettlestrings

(57) ABSTRACT

A device for capping and sealing a refrigeration service valve fitting of quick disconnect type for minimizing unwanted seepage of refrigerant from the fitting. The device includes a cap defining a base and an open-ended sealing portion extending longitudinally from the base. The sealing portion defines first and second internal cylindrical surfaces wherein the first surface defines a first internal diameter and the second surface defines a second internal diameter greater than the first diameter and wherein a shoulder defines a boundary between the surfaces. The first surface defines a groove containing an annular flexible member for sealingly engaging the fitting when the device is positioned on the fitting. Features are provided in relationship with the sealing portions for removably retaining the device on the fitting by engaging a conventional lock groove in the fitting.

9 Claims, 7 Drawing Sheets

U.S. PATENT DOCUMENTS

| | | |
|---|---|---|
| 6,561,237 B1 | 5/2003 | Brass et al. |
| 6,652,495 B1 * | 11/2003 | Walker .................. 604/319 |
| 6,662,587 B2 | 12/2003 | Rembold et al. |
| 6,719,003 B2 | 4/2004 | Schroeder et al. |
| 6,805,252 B2 | 10/2004 | Druitt |
| 6,851,442 B2 | 2/2005 | Knowles et al. |
| 6,901,947 B2 | 6/2005 | Danielson et al. |
| 7,051,996 B2 | 5/2006 | Grau |
| 7,370,673 B2 | 5/2008 | Trumbower et al. |
| 7,478,649 B2 | 1/2009 | Brass et al. |
| 7,494,158 B2 | 2/2009 | Weh et al. |
| 7,695,022 B2 * | 4/2010 | Wells ..................... 285/45 |
| 2007/0205387 A1 | 9/2007 | Grau et al. |

* cited by examiner

DEVICE FOR CAPPING AND SEALING REFRIGERATION SERVICE VALVE FITTINGS OF QUICK DISCONNECT TYPE

CROSS-REFERENCE TO RELATED APPLICATION

This application claims the benefit of U.S. Provisional Patent Application Ser. No. 61/273,406, filed Aug. 5, 2009.

BACKGROUND OF THE INVENTION

Service fittings of quick disconnect type have been used on many systems, such as those described in U.S. Pat. Nos. 2,765,181 and 2,739,374 to convey refrigerant to and from mobile and stationary air conditioning systems. This invention relates to devices for capping and sealing refrigeration service valve fittings of quick disconnect type and more particularly to such devices which seal the fittings to prevent or minimize unwanted seepage of refrigerant from leaking service fitting valves of quick disconnect type.

Today, significant amounts of refrigerant are lost to the atmosphere by leaks from service valve fittings and valves. Presently used fitting caps are thin, non-pressure-resistant plastic caps which have small threads that are retained on service valve fittings by threadably engaging mating threads that are positioned within the fitting. These currently used fitting caps cover the fitting at the tip face of the fitting and are not effective in preventing leakage of refrigerant from the fitting in the event that the valve within the fitting leaks. Currently used fitting caps are designed only to protect the fittings from dust and dirt when the fittings are not in use and cannot hold back full system pressure if the valve within the fitting leaks.

It is, therefore, an object of the present invention to provide capping and sealing devices for refrigeration service valve fittings of quick disconnect type.

Another object is to provide such devices which do not threadably engage the fitting.

A further object of the invention is the provision of such devices which are held in place on the fitting by the lock groove on the fitting.

Still another object is to provide such devices which sealingly engage the outside barrel or surface of the fitting to prevent or minimize leakage of refrigerant into the atmosphere Yet another object of the present invention is the provision of such devices which hold back full system refrigerant pressure in the event of a leaking valve so as to prevent or minimize leakage of refrigerant past the devices.

Another object is to provide such devices which can be sized to fit high or low side pressure fitting sizes on commonly used air conditioning service valve fittings of quick disconnect type.

A still further object is to provide such devices which can be quickly and easily positioned onto or removed from refrigeration service valve fittings of quick disconnect type without the use of any tools.

Yet another object of the present invention is the provision of such devices which reduce or eliminate the cost of repairing or replacing defective service valve fittings and valves by sealing the fittings to prevent or reduce refrigerant leakage.

Another object is to provide such devices which protect the environment from unintentional refrigerant discharges from defective service valve fittings and valves.

A further object is to reduce global warming by reducing leakage of refrigerant into the atmosphere.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

BRIEF SUMMARY OF THE INVENTION

To achieve these and other objects, the present invention provides devices for capping and sealing refrigeration service valve fittings of quick disconnect type for minimizing unwanted seepage of refrigerant from the fittings, the devices each comprising: a cap defining a base and an open-ended sealing portion extending longitudinally from the base, the sealing portion defining first and second internal cylindrical surfaces; the first internal cylindrical surface defining a first internal diameter and the second internal cylindrical surface defining a second internal diameter greater than the first diameter; a first shoulder defining a boundary between the first and the second internal cylindrical surfaces; the first internal cylindrical surface defining at least a first annular groove therein; an annular, flexible sealing member positioned and held within the groove and extending inwardly from the first internal cylindrical surface for sealingly engaging the fittings when the devices are positioned on the service valve fittings; and means in operative relationship with the sealing portion for removably retaining the devices on the service valve fittings.

It is to be understood that both the foregoing general description and the following detailed description are exemplary and explanatory but are not restrictive of the invention.

BRIEF DESCRIPTION OF THE SEVERAL VIEWS OF THE DRAWINGS

The accompanying drawings, which are incorporated in and constitute a part of this specification, illustrate a preferred embodiment of the invention and, together with the description, serve to explain the principles of the invention.

DETAILED DESCRIPTION OF THE INVENTION

Figure 1:
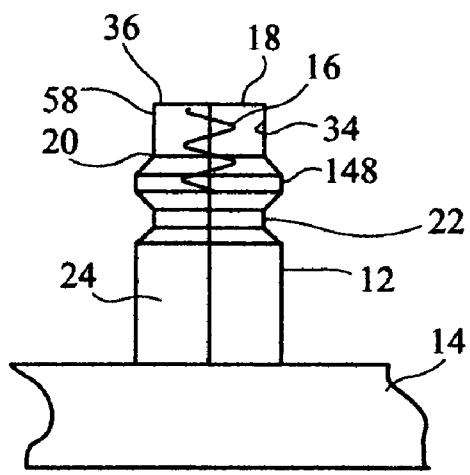
FIG. 1 is an elevation view of a conventional R134a refrigeration service valve charge fitting connected to a refrigeration pipe.

With reference now to the drawings, wherein like reference characters designate like or corresponding parts throughout the several views, there is shown in FIG. 1 a conventional R134a service valve charge fitting 12 conventionally mounted on refrigeration pipe 14. Fitting 12 has internal retaining threads 16 located adjacent to open end 18.

Fitting 12 is a snap-on or quick disconnect fitting of conventional configuration having an external shoulder 20 and an annular lock groove 22 positioned adjacent to and between shoulder 20 and base portion 24 of the fitting.

Figure 2:
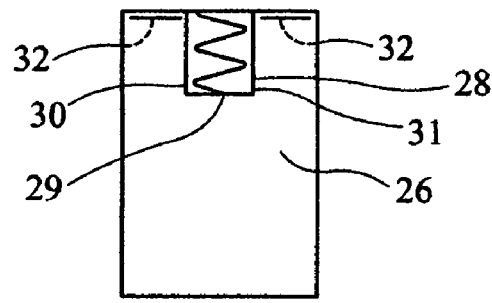
FIG. 2 is an elevation view of a conventional, non-pressure-sealing dust cap.
Figure 3:
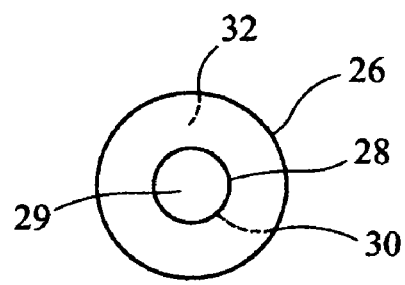
FIG. 3 is a top plan view of the cap shown in FIG. 2.
Figure 4:
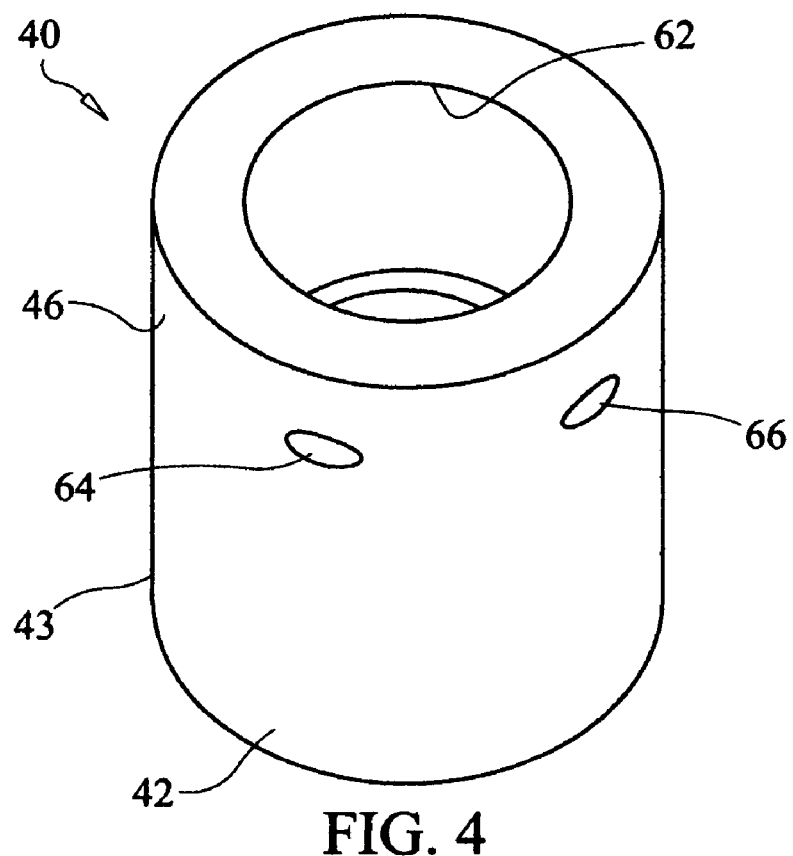
FIG. 4 is a bottom perspective view of a first embodiment of this invention.
Figure 5:
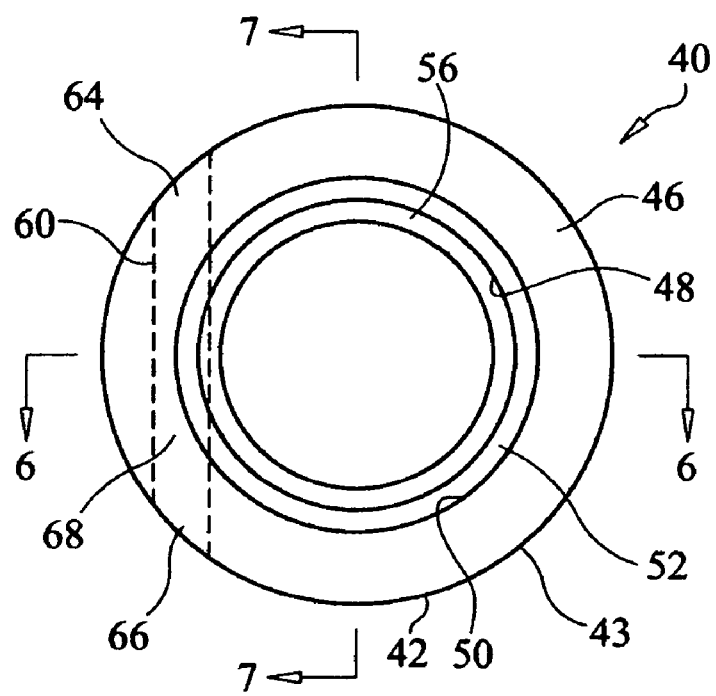
FIG. 5 is a bottom plan view of the embodiment shown in FIG. 4.
Figure 6:
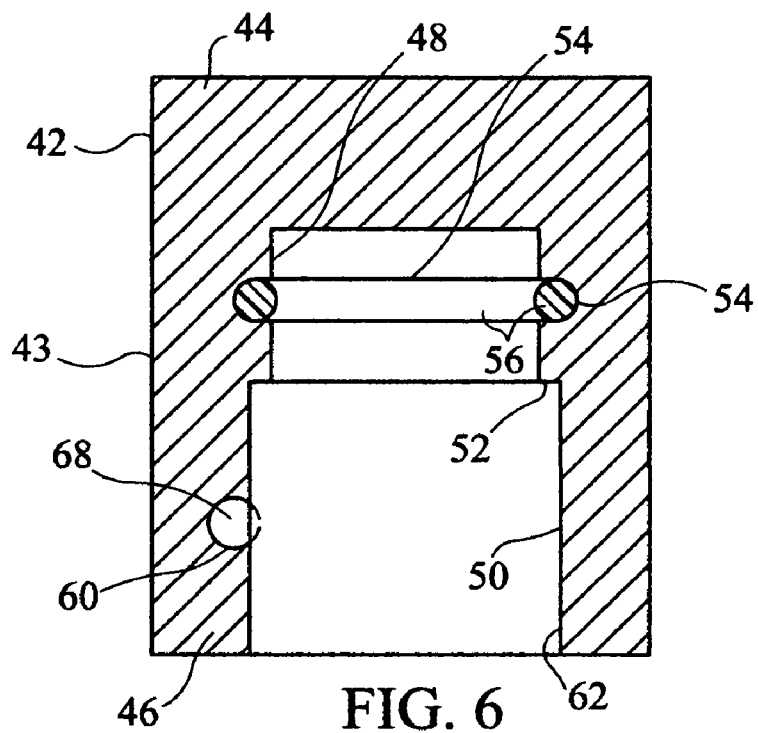
FIG. 6 is a cross-sectional view taken along the line 6-6 in FIG. 5 and looking in the direction of the arrows.
Figure 7:
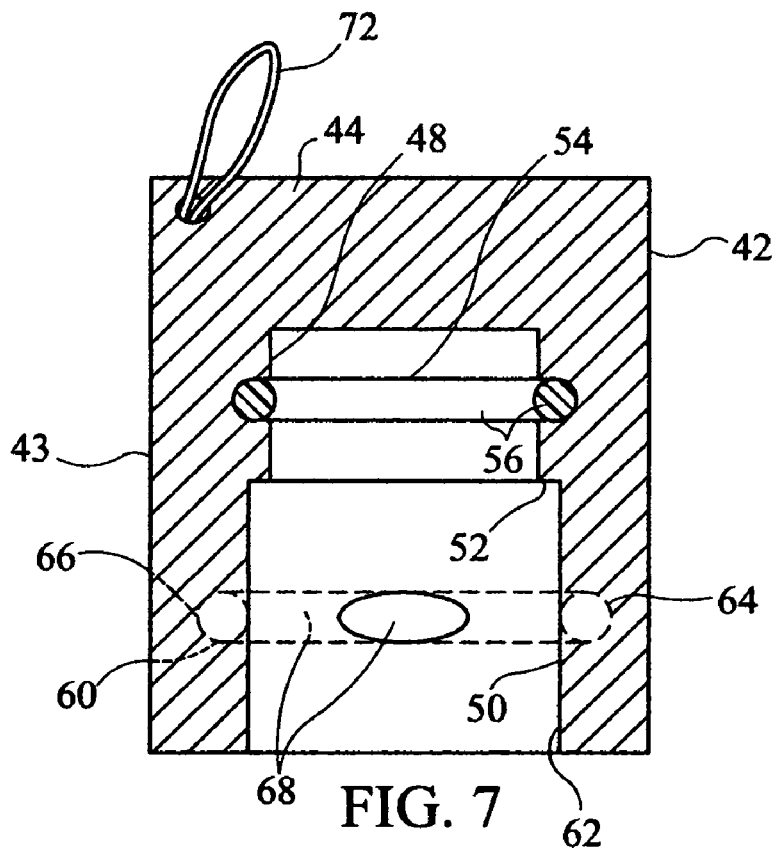
FIG. 7 is a cross-sectional view taken along the lines 7-7 in FIG. 5 and looking in the direction of the arrows.

FIGS. 2 and 3 illustrate the currently used thin, plastic, non-pressure-sealing dust cap 26 which includes an inward cylindrical projection 28 having a closed end 29 and having external threads 30 on cylindrical surface 31 for threadably engaging internal threads 16 in fitting 12. An O-ring shaped gasket 32 is internally positioned within cap 26 for contacting upper surface edge 36 of fitting 12 when cap 26 is threaded onto fitting 12 with projection 28 of the cap threadably inserted within internal barrel 34 of fitting 12.

Caps 26 are not designed for preventing loss of refrigerant from fittings 12 in the event that the internal valves (not shown) within the fittings leak. As a result, refrigerant is often lost from the refrigeration system and into the atmosphere. In contrast, the devices of this invention described herein completely seal service valve fittings 12 to prevent escape of refrigerant from the fittings and into the atmosphere. The devices of this invention significantly reduce the cost and frequency of repairing or replacing defective service valve fittings and defective service valves because of the ability of the devices to seal the service valve fittings to prevent leakage of refrigerant into the atmosphere.

With reference now to FIGS. 4-9, there is shown a first embodiment 40 of the invention, which is a device for capping and sealing a refrigeration service valve fitting 12 of quick disconnect type for minimizing unwanted seepage of refrigerant from fitting 12.

In this embodiment of the invention, device 40 includes a cap 42 defining a base 44 and an open-ended sealing portion 46 which extends longitudinally from base 44. Sealing portion 46 defines first 48 and second 50 internal cylindrical surfaces. First internal cylindrical surface 48 defines a first internal diameter and second internal cylindrical surface 50 defines a second internal diameter greater than the first internal diameter of cylindrical surface 48. A first shoulder 52 defines a boundary between first 48 and second 50 internal cylindrical surfaces.

First internal cylindrical surface 48 defines at least a first annular groove 54 therein, and an annular, flexible sealing member 56 is positioned and conventionally held within groove 54 and extends inwardly from first internal cylindrical surface 48 for sealingly engaging external cylindrical surface or barrel 58 of fitting 12 when device 40 is positioned on service valve fitting 12.

First internal cylindrical surface 48 extends directly from base 44, and second internal cylindrical surface 50 is contiguous with an open end 62 of sealing portion 46.

In accordance with this embodiment of the invention, means 60 are provided in operative relationship with sealing portion 46 for removably retaining device 40 on service valve fitting 12.

As shown in FIGS. 4-9, retaining means 60 include first 64 and second 66 aligned openings defined through sealing portion 46 and which together define a straight passageway 68 through second internal cylindrical surface 50.

Figure 8:
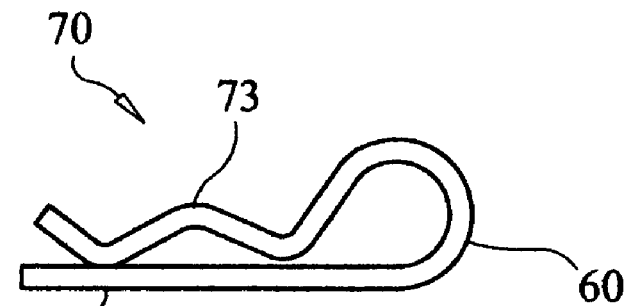
FIG. 8 is an elevation view of retaining pin or clip 70.
Figure 9:
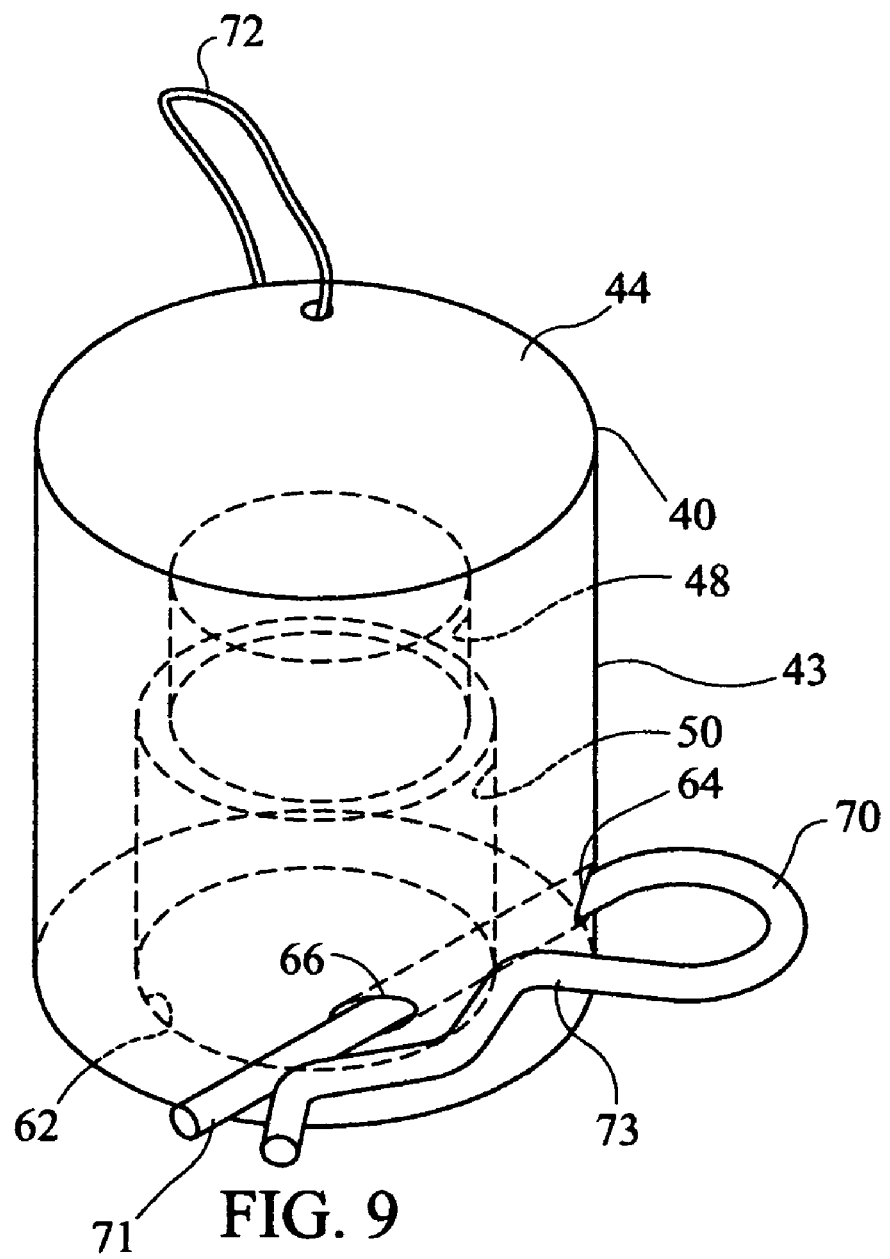
FIG. 9 is a top perspective view of the embodiment shown in FIG. 4 with pin or clip 70 inserted.
Figure 10:
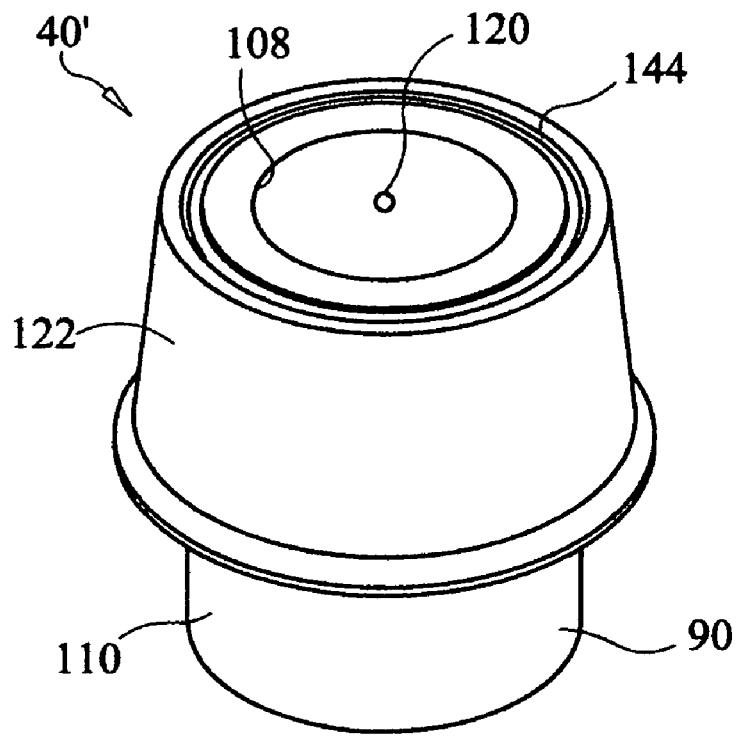
FIG. 10 is a bottom perspective view of a second invention embodiment.
Figure 11:
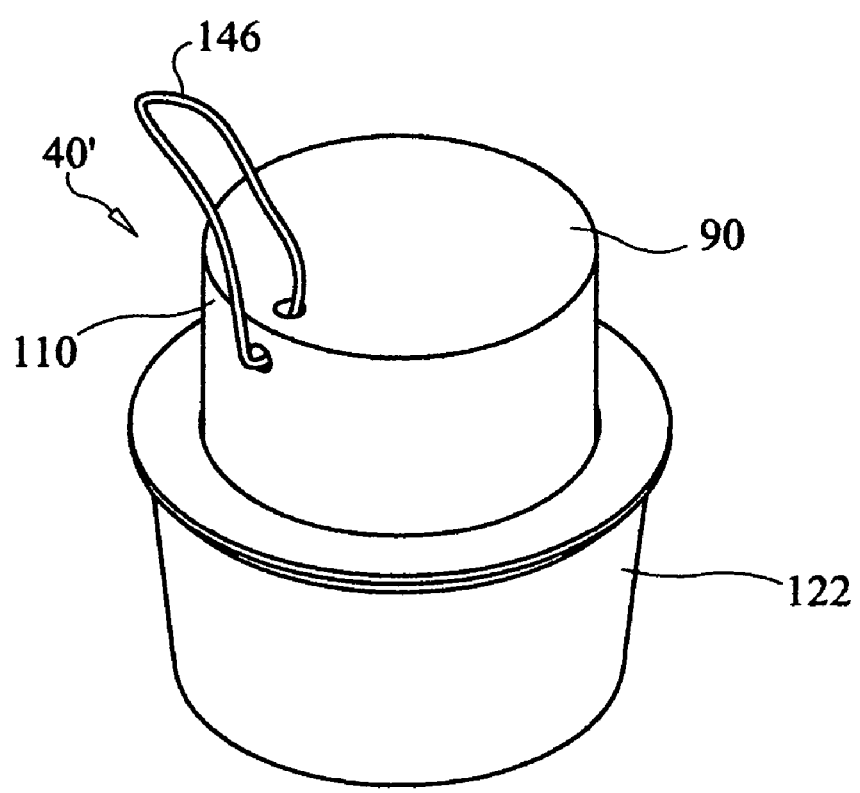
FIG. 11 is a top perspective view of the embodiment shown in FIG. 10.
Figure 12:
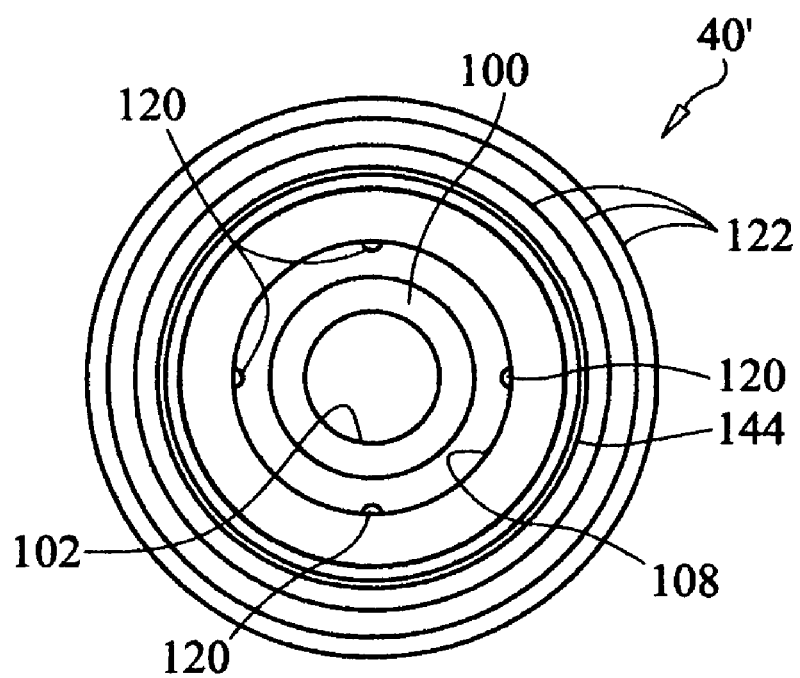
FIG. 12 is a bottom plan view of the embodiment shown in FIG. 11.
Figure 13:
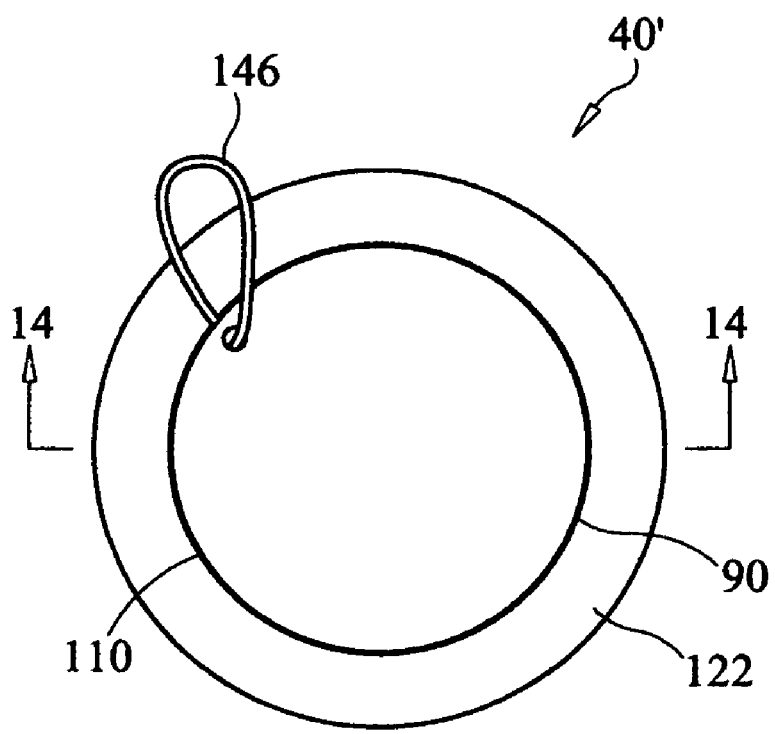
FIG. 13 is a top plan view of the embodiment shown in FIG. 11.
Figure 14:
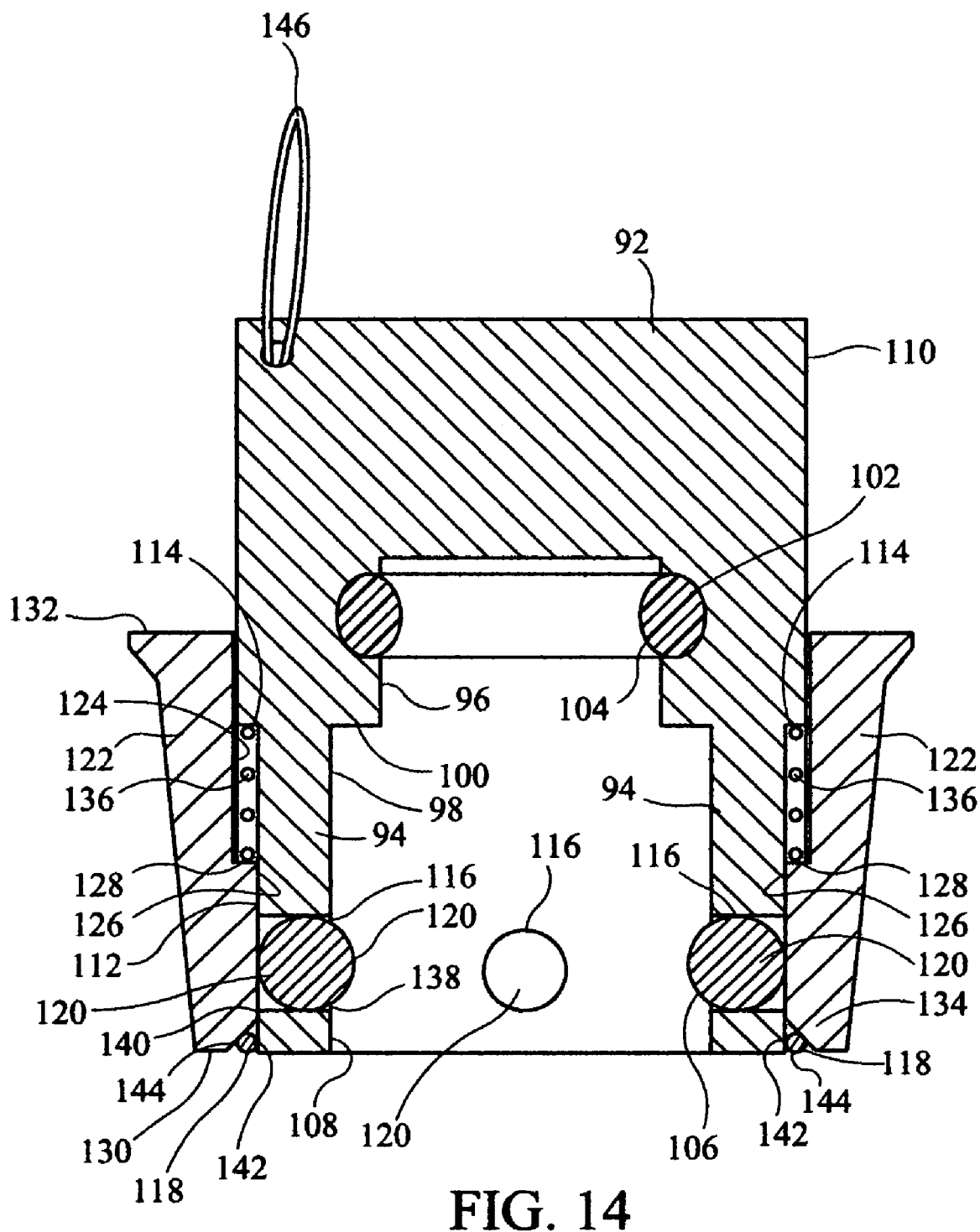
FIG. 14 is a cross-sectional view taken along the lines 14-14 in FIG. 13 and looking in the direction of the arrows.

Retaining means 60 further include a spring-like retaining pin or clip 70, shown in FIG. 8, which is shaped to be removably positioned through openings 64, 66 and through passageway 68 and to be removably retained through openings 64, 66 and through passageway 68 and held on cap 42 so that pin 70 removably engages annular locking groove 22 of fitting 12 to retain device 40 on fitting 12. See FIG. 9.

A lanyard 72 is conventionally secured to cap 42 to prevent personal injury from possible forceful ejection of device 40 when it is removed from fitting 12. The lanyard can be secured to pipe 14 or to fitting 12.

In operation and use of embodiment 40, illustrated in FIGS. 4-9, device 40 is manually placed directly onto charge fitting 12. In this position annular sealing member 56 contacts and sealingly engages external cylindrical surface or barrel 58 of fitting 12 to prevent refrigerant leakage in the event that the valve (not shown) within fitting 12 leaks.

Leg 71 of retaining pin 70 (FIG. 8) is then inserted into and passes through openings 64, 66, passageway 68 and a portion of locking groove 22. Leg 73 of pin 70 is configured in a W shape, as shown, to simultaneously engage cylindrical outer surface 43 of cap 42 as leg 73 is moved away from leg 71 as a result of the spring-like characteristics of pin 70 so that pin 70 is held in position with a portion of leg 71 within annular lock groove 22 of fitting 12. In this manner, retaining pin 70 holds device 40 in fixed position on fitting 12.

Device 40 is comprised of metal and can be sized to fit high and low side pressure fitting sizes on commonly used air conditioning service valve fittings of quick disconnect type.

With reference now to FIGS. 10-14 there is illustrated another preferred embodiment 40' of the invention, which functions to cap and seal a refrigeration service valve fitting 12 of quick disconnect type for minimizing unwanted seepage of refrigerant from fitting 12.

Device 40' includes a cap 90 defining a base 92 and an open-ended sealing portion 94 which extends longitudinally from base 92.

Sealing portion 94 defines first 96 and second 98 internal cylindrical surfaces. First internal cylindrical surface 96 defines a first internal diameter and second internal cylindrical surface 98 defines a second internal diameter greater than the first diameter. A first shoulder 100 defines a boundary between first 96 and second 98 internal cylindrical surfaces.

First internal cylindrical surface 96 defines at least a first annular groove 102 therein, and annular, flexible sealing member 104 is positioned and held within groove 102 and extends inwardly from first internal cylindrical surface 96 for sealingly engaging external cylindrical surface or barrel 58 of fitting 12 when device 40' is positioned on service valve fitting 12.

First internal cylindrical surface 96 extends directly from base 92, and second internal cylindrical surface 98 is contiguous with an open end 108 of sealing portion 94.

In accordance with this embodiment of the invention, means 106 are provided in operative relationship with sealing portion 94 for removably retaining device 40' on service valve fitting 12.

Retaining means 106 include sealing portion 94 which defines a first external cylindrical surface 110 having a first external diameter and which further defines a second external cylindrical surface 112 having a second external diameter less than the first external diameter of surface 110.

A second shoulder 114 defines a boundary between first 110 and second 112 external cylindrical surfaces.

First external cylindrical surface 110 extends directly from base 92, and second external cylindrical surface 112 is contiguous with open end 108 of sealing portion 94.

A plurality of openings 116 extend through sealing portion 94, through second internal cylindrical surface 98 and through second external cylindrical surface 112.

Device 40' further includes an annular projection 118 which extends outwardly from second external cylindrical surface 112 between the plurality of openings 116 and open end 108 of sealing portion 94.

A plurality of detent balls 120 are positioned, one each, within each one of openings 116, and a collar 122 is provided which is configured and dimensioned to slideably fit over and around first 110 and second 112 external cylindrical surfaces.

Collar 122 defines a third internal cylindrical surface 124 having a third internal diameter and collar 122 further defines a fourth internal cylindrical surface 126 having a fourth internal diameter and wherein the third internal diameter is greater than the fourth internal diameter.

A third shoulder 128 defines a boundary between third 124 and fourth 126 internal cylindrical surfaces. Collar 122 further defines a lower end 130 and an upper end 132 and a beveled surface 134 extending inwardly from lower end 130 of the collar to fourth internal cylindrical surface 126.

A spring 136 is positioned between second shoulder 114 and third shoulder 128 and between second external cylindrical surface 112 and third internal cylindrical surface 124 for normally biasing collar 122 toward open end 108 of sealing portion 94 with beveled surface 134 contacting annular projection 118.

Each of the plurality of openings 116 is substantially cylindrical but is tapered to define an interior open end 138 within second internal cylindrical surface 98 smaller in diameter than an exterior open end 140 within second external cylindrical surface 112 and smaller than the diameter of the plurality of detent balls 120 to prevent the detent balls from inwardly exiting the plurality of openings 116.

Device 40' is dimensioned for enabling detent balls 120 to be retracted into the plurality of openings 116 and away from second internal cylindrical surface 98 to positions contacting beveled surface 134 when collar 122 is moved to compress spring 136 and device 40' is positioned onto fitting 12.

Annular projection 118 is comprised of a second annular groove 142 defined within second external cylindrical surface 112 and an annular retaining member 144 conventionally positioned and held within annular groove 142. Annular retaining member 144 extends outwardly from second external cylindrical surface 112 between the plurality of openings 116 and open end 108 of sealing portion 94.

A lanyard 146 is conventionally attached to cap 90 to secure cap 90 to pipe 14 or fitting 12 so as to prevent personal injury from possible forceful ejection of cap 90 when the cap is removed from fitting 12 for service.

In operation and use of device 40', shown in FIGS. 10-14, device 40' fits directly onto charge fitting 12. No tools are required, and device 40' can be quickly and easily positioned onto fitting 12 in a matter of seconds after removing the existing dust cap 26 shown in FIGS. 2-3.

Cap 90 is first manually moved in relationship with collar 122 so that spring 136 is compressed between shoulders 114 and 128. Device 40' is then positioned over and around fitting 12. As device 40' is moved downwardly over fitting 12, detent balls 120 slidably engage outer cylindrical surface 148 of fitting 12 and are forced outwardly within openings 116 to positions contacting beveled surface 134.

When device 40' is properly positioned over fitting 12, collar 122 is manually released. Spring 136 then expands to move beveled surface 134 against detent balls 120 and to force detent balls 120 inwardly into contact with annular lock groove 22 of fitting 12. Collar 122 is retained in this position with beveled surface 134 contacting annular projection 118 and with internal cylindrical surface 126 maintaining detent balls 120 in position within lock groove 22.

When device 40' is so positioned onto fitting 12, annular flexible sealing member 104 sealingly engages external cylindrical surface or barrel 58 of fitting 12.

Removal of device 40' from fitting 12 is accomplished by simply reversing the above-described procedure for placing device 40' onto fitting 12. Collar 122 is manually moved in relationship with cap 90 to compress spring 136. As device 40' is then lifted from fitting 12 detent balls 120 are allowed to move outwardly within openings 116 as balls 120 engage and are slideably moved upwardly over outer cylindrical surface 148 of fitting 12. Simultaneously, annular flexible sealing member 104 is slideably moved upwardly and off of external cylindrical surface 58 of fitting 12.

The invention in its broader aspects is not limited to the specific details shown and described, and departures may be made from such details without departing from the principles of the invention and without sacrificing its chief advantages.

What is claimed is:

1. A device for capping and sealing a refrigeration service valve fitting of quick disconnect type for minimizing unwanted seepage of refrigerant from the fitting, said device comprising:
    a cap defining a base and an open-ended sealing portion extending longitudinally from said base, said sealing portion defining first and second internal cylindrical surfaces;
    said first internal cylindrical surface defining a first internal diameter and said second internal cylindrical surface defining a second internal diameter greater than said first diameter;
    a first shoulder defining a boundary between said first and said second internal cylindrical surfaces;
    said first internal cylindrical surface defining at least a first annular groove therein spaced apart from said first shoulder;
    an annular, flexible sealing member positioned and held within said groove and extending inwardly from said first internal cylindrical surface for sealingly engaging said fitting when said device is positioned on said service valve fitting; and
    means in operative relationship with said sealing portion for removably retaining said device on said service valve fitting.

2. A device as in claim 1 wherein said first internal cylindrical surface extends directly from said base and wherein said second internal cylindrical surface is contiguous with an open end of said sealing portion.

3. A device as in claim 2 wherein said retaining means include:
    first and second aligned openings defined through said sealing portion and defining a straight passageway and through said second internal cylindrical surface; and
    a retaining pin shaped to be removably positioned through said openings and through said passageway and to be removably retained through said openings and said passageway and held on said cap whereby said pin removably engages said fitting to retain said device on said fitting.

4. A device as in claim 3 further including a lanyard attached to said cap.

5. A device as in claim 2 wherein said retaining means includes:

said sealing portion defining a first external cylindrical surface having a first external diameter;

said sealing portion defining a second external cylindrical surface having a second external diameter less than said first external diameter;

a second shoulder defining a boundary between said first and said second external cylindrical surfaces;

said first external cylindrical surface extending directly from said base and wherein said second external cylindrical surface is contiguous with said open end of said sealing portion;

a plurality of openings extending through said sealing portion, through said second internal cylindrical surface and through said second external cylindrical surface;

an annular projection extending outwardly from said second external cylindrical surface between said plurality of openings and said open end of said sealing portion;

a plurality of detent balls positioned, one each, within each of said plurality of openings;

a collar configured and dimensioned to slidably fit over and around said first and said second external cylindrical surfaces;

said collar defining a third internal cylindrical surface having a third internal diameter and a fourth internal cylindrical surface having a fourth internal diameter, said third internal diameter being greater than said fourth internal diameter;

a third shoulder defining a boundary between said third and said fourth internal cylindrical surfaces;

said collar further defining a lower end and an upper end and a beveled surface extending inwardly from said lower end of said collar to said fourth internal cylindrical surface; and a spring positioned between said second and said third shoulders and between said second external cylindrical surface and said third internal cylindrical surface for normally biasing said collar toward said open end of said sealing portion with said beveled surface contacting said annular projection.

6. A device as in claim 5 wherein each of said plurality of openings is substantially cylindrical but is tapered to define an interior open end within said second internal cylindrical surface smaller in diameter than an exterior opening end within said second external cylindrical surface and smaller than the diameter of said plurality of detent balls to prevent said detent balls from inwardly exiting said plurality of openings.

7. A device as in claim 6 wherein said device is dimensioned for enabling said detent balls to be retracted into said plurality of openings and away from said second internal cylindrical surface to positions contacting said beveled surface when said collar is moved to compress said spring and as said device is positioned onto said fitting.

8. A device as in claim 7 wherein said annular projection is comprised of a second annular groove defined within said second external cylindrical surface and an annular retaining member positioned and held within said second annular groove, said annular retaining member extending outwardly from said second external cylindrical surface between said plurality of openings and said open end of said sealing portion.

9. A device as in claim 8 further including a lanyard attached to said cap.

* * * * *